US011874593B2

(12) United States Patent
Liu et al.

(10) Patent No.: US 11,874,593 B2
(45) Date of Patent: Jan. 16, 2024

(54) VEHICULAR EXTERIOR CAMERA WITH VACUUM SEALED LENS ASSEMBLY

(71) Applicant: Magna Electronics Inc., Auburn Hills, MI (US)

(72) Inventors: Zhongyao Liu, Troy, MI (US); Jonathan D. Conger, Berkley, MI (US); Steven V. Byrne, Goodrich, MI (US); Jeffrey A. White, Howell, MI (US); Kevin T. Smith, Rochester Hills, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 0 days.

(21) Appl. No.: 17/811,320

(22) Filed: Jul. 8, 2022

(65) Prior Publication Data

US 2023/0020304 A1    Jan. 19, 2023

Related U.S. Application Data

(60) Provisional application No. 63/203,376, filed on Jul. 20, 2021, provisional application No. 63/203,119, filed on Jul. 9, 2021.

(51) Int. Cl.
| | |
|---|---|
| *H04N 5/335* | (2011.01) |
| *G03B 30/00* | (2021.01) |
| *G03B 17/55* | (2021.01) |
| *H04N 23/51* | (2023.01) |
| *H04N 23/52* | (2023.01) |
| *H04N 23/54* | (2023.01) |
| *H04N 23/55* | (2023.01) |

(52) U.S. Cl.
CPC ............. *G03B 30/00* (2021.01); *G03B 17/55* (2013.01); *H04N 23/51* (2023.01); *H04N 23/52* (2023.01); *H04N 23/54* (2023.01); *H04N 23/55* (2023.01)

(58) Field of Classification Search
CPC ...................................................... G03B 30/00
See application file for complete search history.

(56) References Cited

U.S. PATENT DOCUMENTS

| | | | |
|---|---|---|---|
| 5,550,677 | A | 8/1996 | Schofield et al. |
| 5,670,935 | A | 9/1997 | Schofield et al. |
| 5,949,331 | A | 9/1999 | Schofield et al. |
| 7,038,577 | B2 | 5/2006 | Pawlicki et al. |
| 7,720,580 | B2 | 5/2010 | Higgins-Luthman |
| 7,855,755 | B2 | 12/2010 | Weller et al. |
| 7,965,336 | B2 | 6/2011 | Bingle et al. |

(Continued)

*Primary Examiner* — Gary C Vieaux
(74) *Attorney, Agent, or Firm* — HONIGMAN LLP (57) ABSTRACT

A vehicular camera assembly includes a lens barrel accommodating at least an outer lens element and an inner lens element. An imager printed circuit board (imager PCB) includes an imager disposed at a side. The lens barrel is disposed at the housing such that the imager is aligned with the inner lens element and the outer lens element, with the inner lens element disposed closer to the imager than the outer lens element. A vacuum exists in a space between the outer lens element and the inner lens element to thermally insulate an outer surface of the outer lens element from an inner surface of the inner lens element. Light passing through the outer lens element, the vacuum, and the inner lens element is imaged by the imager.

25 Claims, 7 Drawing Sheets

(56) References Cited

U.S. PATENT DOCUMENTS

| | | | |
|---|---|---|---|
| 8,188,432 B1* | 5/2012 | Nguyen | H04N 5/33 |
| | | | 250/353 |
| 10,071,687 B2 | 9/2018 | Ihlenburg et al. | |
| 10,099,614 B2 | 10/2018 | Diessner | |
| 10,596,982 B2* | 3/2020 | Bingle | H04N 25/76 |
| 10,761,319 B2 | 9/2020 | Kumar | |
| 10,894,275 B2 | 1/2021 | Byrne et al. | |
| 11,199,758 B2 | 12/2021 | Sesti et al. | |
| 11,397,306 B2 | 7/2022 | Liu et al. | |
| 2016/0272163 A1 | 9/2016 | Dreiocker et al. | |
| 2019/0121051 A1 | 4/2019 | Byrne et al. | |
| 2019/0124238 A1 | 4/2019 | Byrne et al. | |
| 2019/0124243 A1 | 4/2019 | Mleczko et al. | |
| 2019/0306966 A1 | 10/2019 | Byrne et al. | |
| 2020/0001787 A1 | 1/2020 | Lu et al. | |
| 2020/0033549 A1 | 1/2020 | Liu et al. | |
| 2020/0137926 A1 | 4/2020 | Wohlte | |
| 2020/0154020 A1 | 5/2020 | Byrne et al. | |
| 2020/0307455 A1 | 10/2020 | Liu et al. | |
| 2020/0314311 A1 | 10/2020 | Liu et al. | |
| 2020/0412925 A1 | 12/2020 | Byrne et al. | |
| 2021/0103119 A1 | 4/2021 | Reckker et al. | |
| 2021/0382375 A1 | 12/2021 | Sesti et al. | |
| 2022/0053112 A1 | 2/2022 | Lu | |
| 2022/0089102 A1* | 3/2022 | Sauer | H04N 23/57 |
| 2022/0103723 A1 | 3/2022 | Skrocki et al. | |

* cited by examiner

Vents in alternating locations

VEHICULAR EXTERIOR CAMERA WITH VACUUM SEALED LENS ASSEMBLY

CROSS REFERENCE TO RELATED APPLICATIONS

The present application claims priority of U.S. provisional application Ser. No. 63/203,376, filed Jul. 20, 2021, and U.S. provisional application Ser. No. 63/203,119, filed Jul. 9, 2021, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A vehicular camera configured to be disposed at a vehicle includes a lens barrel accommodating an outer lens element and an inner lens element. A camera housing includes first and second portions that are joined together. An imager printed circuit board (imager PCB) includes a first side and a second side opposite the first side with the imager disposed at the first side. The imager includes a two dimensional imaging array having at least one million photosensors arranged in rows and columns. The lens barrel is received at the first portion of the housing such that the imager is aligned with the lens. The inner lens element is disposed closer to the imager than the outer lens element. With the imager aligned with the lens barrel, the imager is operable to capture image data representative of light that passes through the lens barrel via the outer lens element and the inner lens element. A vacuum space exists between the outer lens element and the inner lens element, and light passes through the lens barrel by passing through the outer lens element, the vacuum space, and the inner lens element to the imager. The vacuum space thermally insulates an outer surface of the outer lens element from an inner surface of the inner lens element to reduce or eliminate condensation that may form at the inner surface of the inner lens element.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
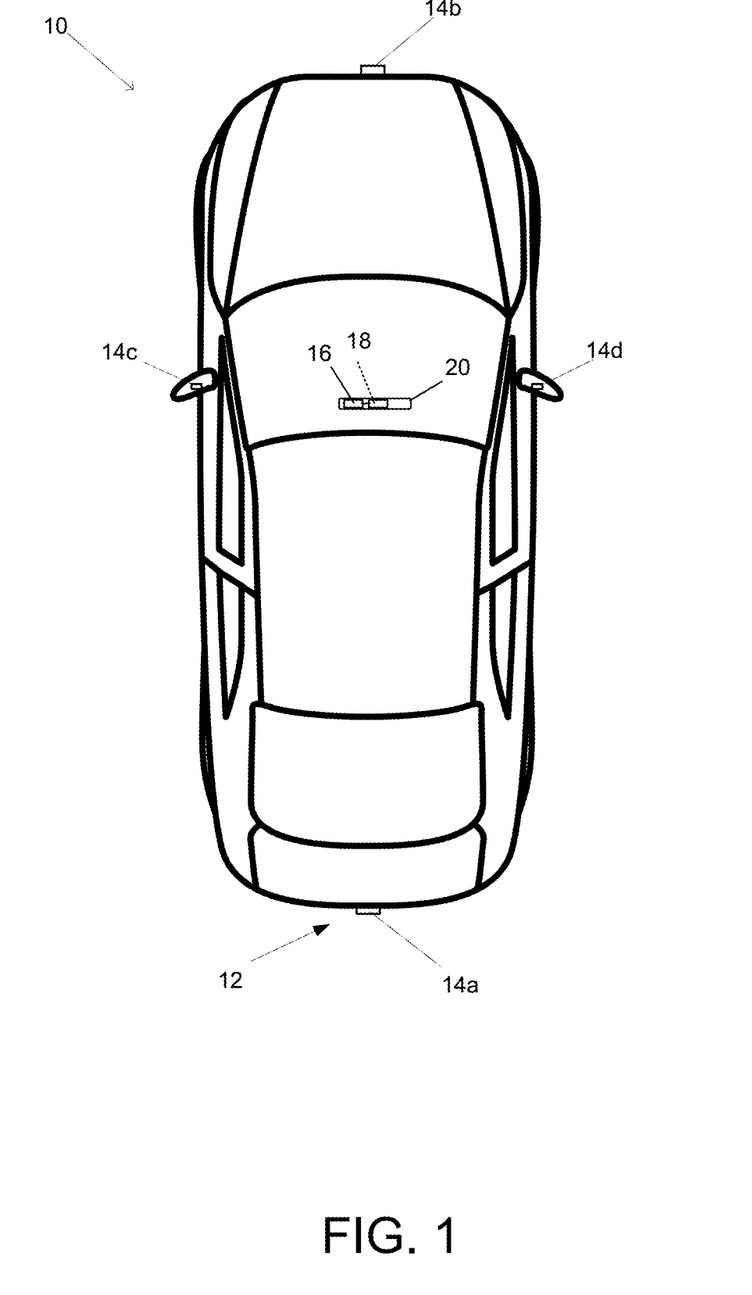
FIG. 1 is a plan view of a vehicle with a vision system that incorporates cameras.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control 18 and/or the display device 16 may be disposed elsewhere at or in the vehicle). The data transfer or signal communication from the camera to the ECU may comprise any suitable data or communication link, such as a vehicle network bus or the like of the equipped vehicle.

Figure 2:
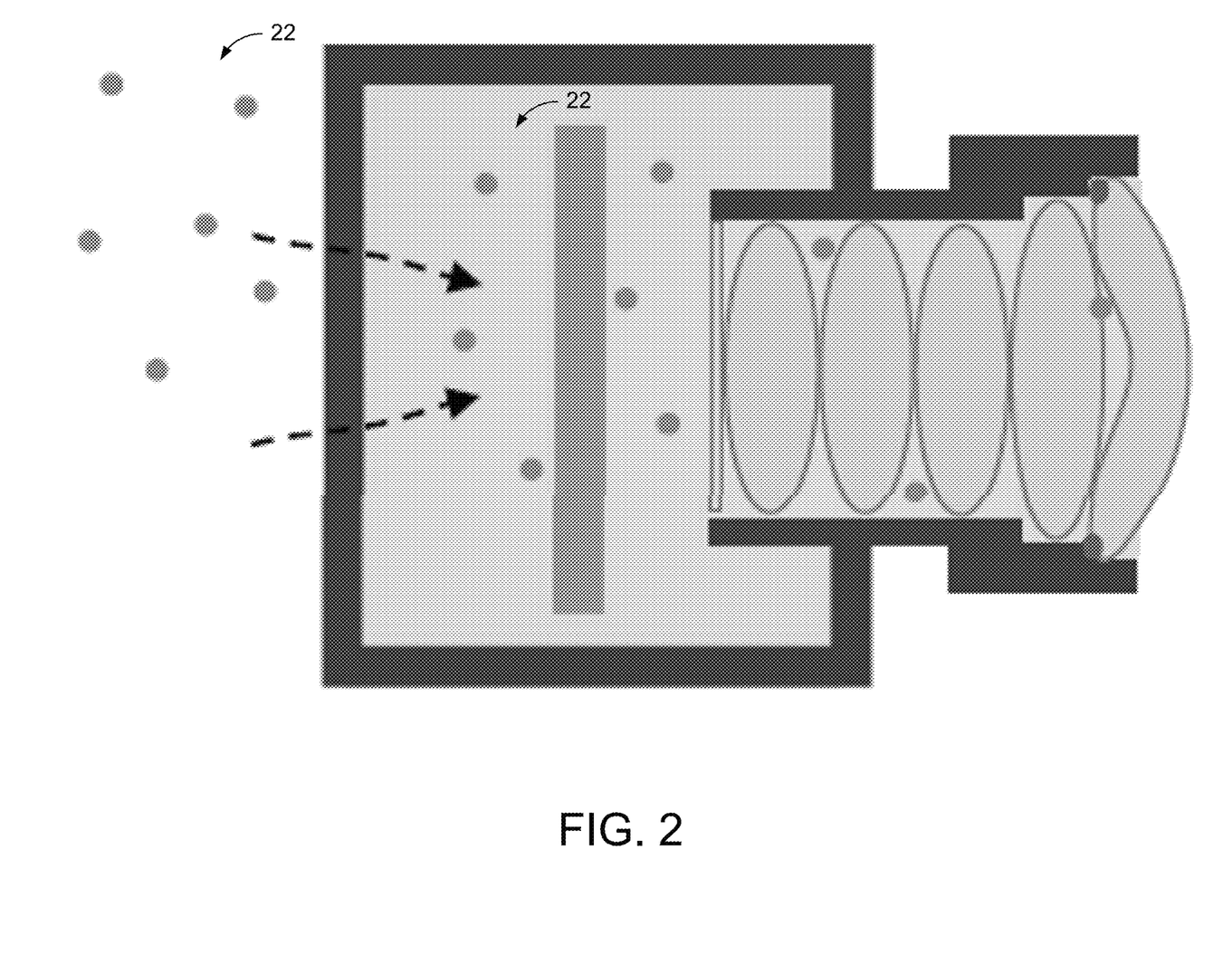
FIG. 2 is a cross section view of a camera of the vision system of FIG. 1.
Figure 3:
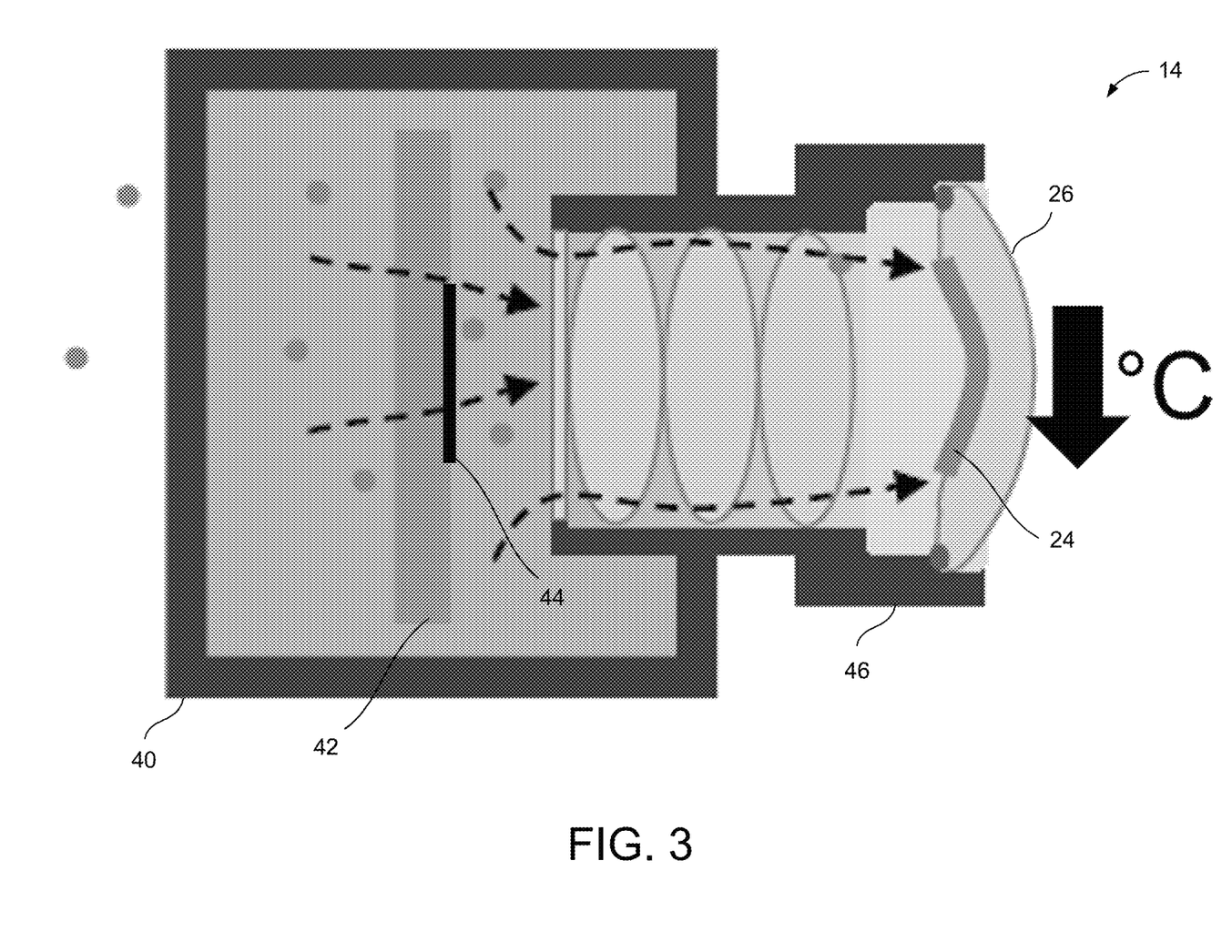
FIG. 3 is a cross section view of the camera of FIG. 2 with condensation on an optic element of a lens of the camera.

Referring now to FIG. 2, vehicular cameras 14 positioned at an exterior portion of the vehicle and being at least partially exposed at the exterior of the vehicle are often subject to harsh conditions, including moisture from rain, snow, and humidity. Typical vehicular cameras fail to perfectly seal the camera housing from moisture 22 (especially cameras with plastic housings), and eventually moisture 22 leaks into or is absorbed into the camera housing. This may damage the electronic components of the camera and occlude the imager such that there are occlusions or blobs representative of occlusions in the captured image data. As shown in FIG. 3, the moisture 22 may eventually reach the surface of one or more lens elements or optic elements 26 within the camera 14, and when the camera 14 is exposed to cold temperatures (which frequently occurs with vehicular cameras), the moisture may condense due to the temperature differential between the environment of the vehicle and the inner temperature of the camera and cause condensation 24 (e.g., a layer of condensation) on one or more of the lens elements 26 of the camera 14. For example, the condensation layer 24 may form at an inner surface of an outermost optic element 32 of the lens 28 of the camera 14, where the outermost optic element 32 defines an outermost barrier between the inner portion of the camera (i.e., the lens barrel 46 and housing 40 of the camera) and the environment at the exterior portion of the vehicle. The condensation 24 may impede or degrade the camera's ability to capture clear image data. That is, when the camera is exposed to cold environmental temperatures (i.e., colder than a temperature at the inner portion of the camera, which may be heated by electrical operation of the camera), the cold environment may cool the outermost lens element, causing a temperature differential between the outermost lens element and the inner portion of the camera, leading to condensation of the moisture within the camera at the inner surface of the lens element. In other words, when a lens element is cooled by cold environmental temperatures, condensation may form at the inner surface of the lens element when moisture is present at the inner portion of the camera.

Figure 4:
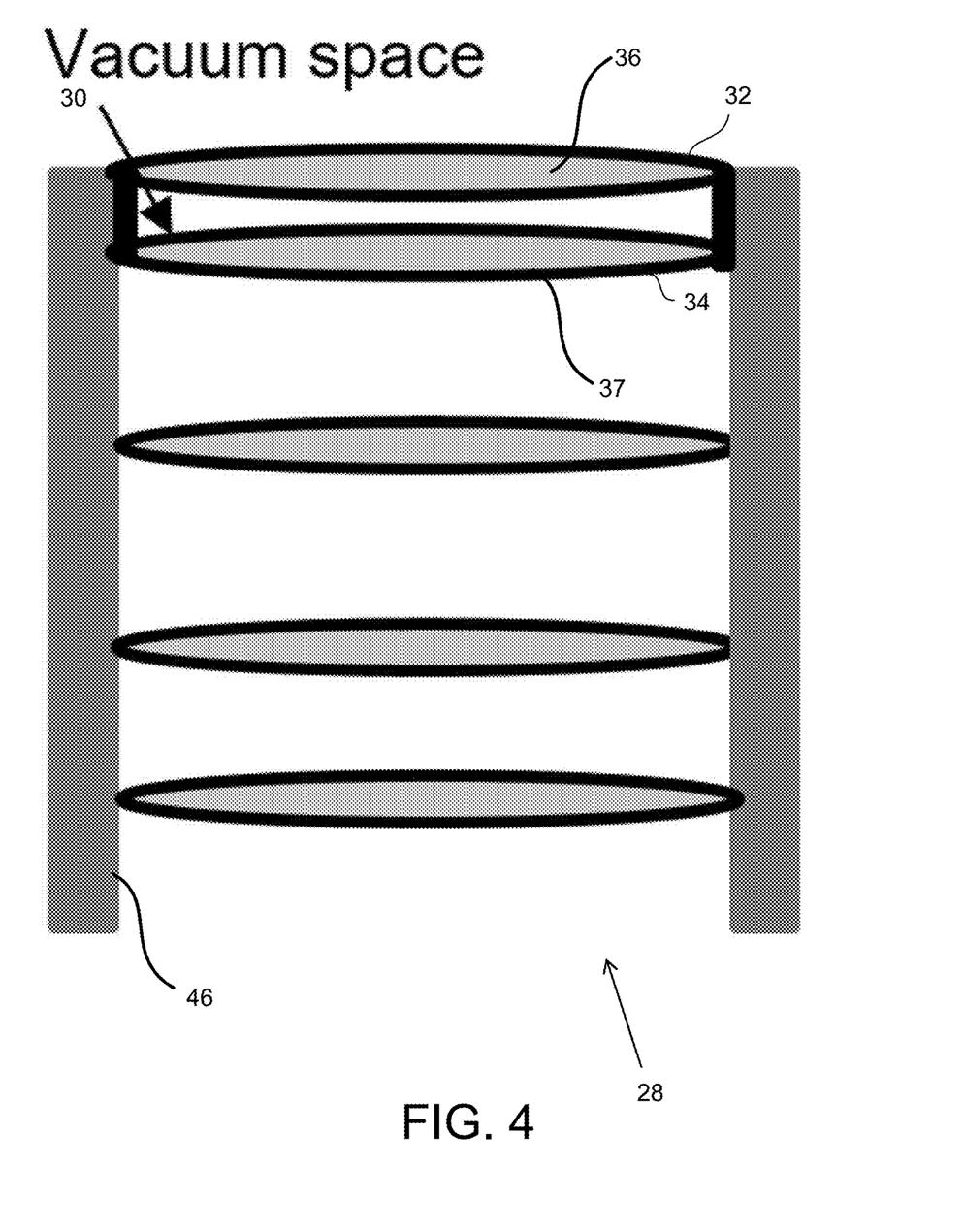
FIG. 4 is a portion of a camera with a vacuum space between optic elements of the lens.

Referring now to FIG. 4, ensuring that a temperature of the inner surface 37 of the lens remains warmer than the dew point, even when the outer surface 36 of the lens becomes cold, may prevent condensation from forming at the lens. As shown in FIG. 4, the camera lens 28 or lens barrel 46 may include a vacuum space 30 between the first or outer lens element 32 and a second or inner lens element 34. The vacuum space 30 acts as an insulator, prohibiting heat transfer between the first lens element 32 and the second lens element 34. Thus, the outermost lens element 32 exposed to the environmental temperature is thermally isolated from the inner lens element 34 exposed to the temperature of the inner portion of the camera and the two lens elements may have different surface temperatures. That is, the vacuum space thermally isolates an outer surface 36 of the outermost lens element 32 from the inner surface 37 of the inner lens element 34. Thus, even when the outer surface 36 of the outermost lens element 32 is exposed to temperatures below the dew point (e.g., due to ambient temperatures), the inner lens element 34 may remain warmer. For example, the inner lens element 34 may be nearer circuitry or other elements that release heat and/or may be more isolated from the ambient temperature than the outer lens element 32. When the inner lens element 34 remains above the dew point, condensation will be greatly reduced or eliminated. Additionally, thermally insulating the inner portion of the camera housing reduces the need for temperature control devices, such as heaters disposed at the lens.

The formation of the vacuum space between the outermost lens element 32 and the inner lens element 34 reduces the intrusion of moisture into the camera cavity from openings in the lens barrel 46. That is, because the vacuum space requires a seal at the outer end of the lens barrel, moisture is less likely to enter the camera 14 via the lens barrel. Because, in some implementations, the outermost lens element 32 may be the only portion of the camera exposed at the exterior of the vehicle, this may reduce the amount of moisture present in the camera. Thus, the vacuum space 30 may maintain the temperature at the inner portion of the camera and reduce or eliminate the introduction of moisture to the camera in the first place. Moreover, the vacuum space 30 between the outermost lens element 32 and the inner lens element 34 keeps moisture out of the space between the two elements.

The inner lens element 34 may be a lens optic or part of a lens or any other transparent element that will not block the camera's field of view. The inner lens element 34 may be connected to the outer lens element 32 via any means sufficient to maintain the vacuum. For example, a metal tube or other material may encompass the vacuum space and securely seal the inner and outer lens elements 32, 34. The lens elements 32, 34 and vacuum space 30 may be applied to any other sensor in addition to cameras that requires a clear line of sight not impeded by condensation. That is, any suitable sensor, such as an infrared camera or lidar sensor or the like, may include an outermost lens element forming an outermost surface of an optical viewer or optical sensing element of the sensor and an inner lens adjacent the outermost lens and having a vacuum space formed between the outermost lens and the inner lens to thermally insulate the inner lens from the outermost surface of the optical viewer or sensing element.

Optionally, the camera 14 may include a heater or heating element to help ensure that the inner lens element 34 remains at a temperature above the dew point. For example, a heater may be disposed at the inner portion of the camera housing or the lens barrel, such as disposed along an inner surface of an optic element and along an outer perimeter portion of the optic element. The camera 14 may include a thermometer or other temperature sensing means to determine an amount of heat necessary to maintain the temperature at the inner lens element 34 above the dew point. The heating system may utilize aspects of the cameras and systems described in U.S. Pat. Nos. 10,894,275; 10,761,319 and/or 7,965,336, and/or U.S. Publication Nos. US-2022-0089102; US-2022-0053112; US-2020-0307455; US-2020-0314311 and/or US-2016-0272163, which are all hereby incorporated herein by reference in their entireties.

Figure 5:
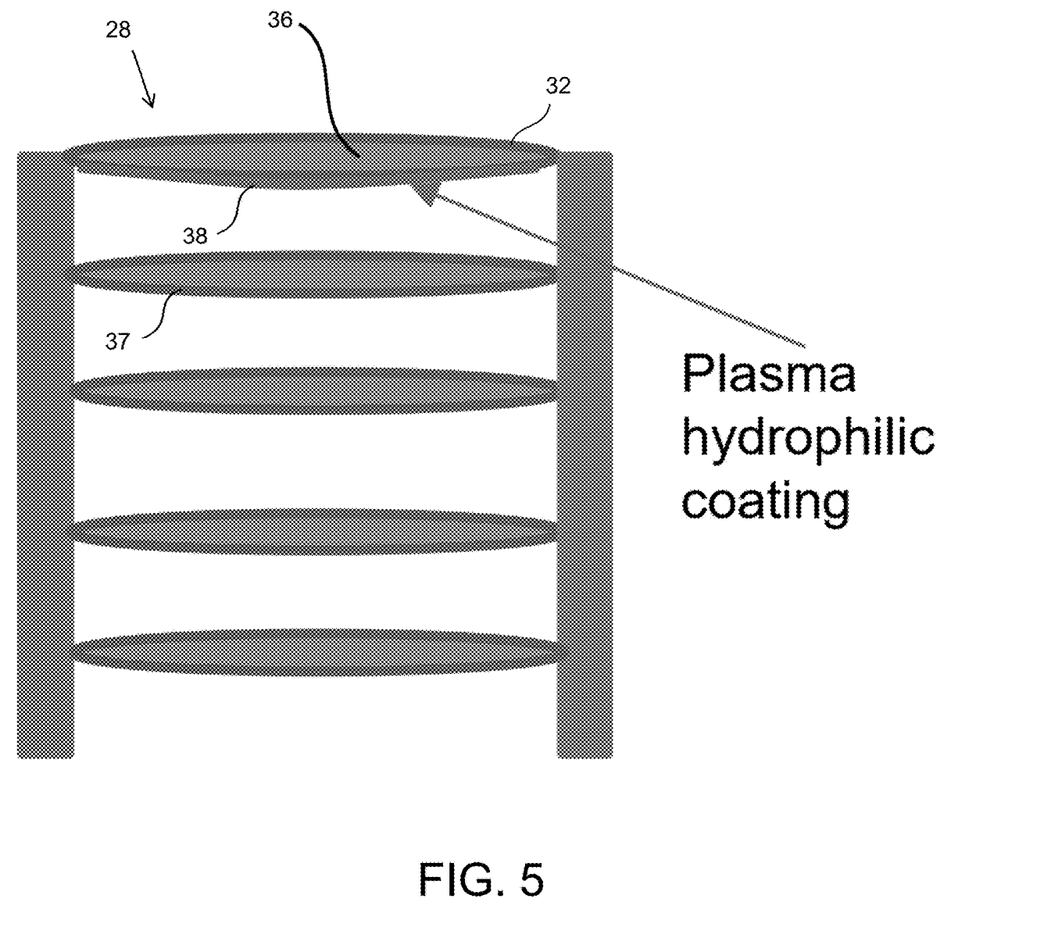
FIG. 5 is a portion of a camera with a plasma hydrophilic coating on an optic element of the lens.

Additionally or alternatively, the outer lens element 32 may include a hydrophilic coating 38 at the inner surface 37 to reduce or eliminate condensation. The hydrophilic coating (e.g., a plasma hydrophilic coating) reduces surface friction and enhances lubricity of the inner lens surface 37 to water, allowing any water (i.e., condensation) to disperse from the lens. Plasma hydrophilic coating is a relatively low cost solution with high durability compared to other hydrophilic coatings. The hydrophilic coating may cover any portion of the inner surface of the lens element, such as the entirety of the inner surface or only along a perimeter region or only at a central region of the inner surface based on, for example, a curvature of the lens (e.g., a convex lens may be more likely to accumulate condensation at the central region when pointing downward), the coating's impact on the captured image data (e.g., disposing the coating along the perimeter region may be less likely to interfere with the captured image data), cost, or assembly requirements. Optionally, one or more, such as each, of the optic elements of the lens may have the hydrophilic coating disposed at a respective surface. For example, when the vacuum space 30 exists between the outermost lens element 32 and the inner lens element 34, the hydrophilic coating may be disposed at the inner surface 37 of the inner lens element 34. When there is no vacuum space between the lens elements, the hydrophilic coating may be disposed at an inner surface of the outermost lens element 32.

Thus, the vehicular camera described herein establishes a vacuum between an inner and an outer lens element in order to reduce heat transfer between the lens elements. This allows the inner lens elements to remain warmer than the outer lens element, such that the formation of condensation on the inner lens element can be reduced or eliminated. For example, a plasma hydrophilic coating, which may be used in conjunction with the vacuum space described above and as shown in FIG. 4 or without the vacuum space as shown in FIG. 5, provides a low cost solution with high durability that reduces condensation that forms at the surface (i.e., the inner surface of the outer lens element 32). Other surfaces of other lens elements may also include one or more hydrophilic coatings as needed.

The vehicular camera 14 may comprise any suitable construction. For example, because the vacuum seal and/or hydrophilic coating may reduce or eliminate condensation forming at the inner surface of the lens optic elements, the camera may not require a water tight or sealed construction and thus may provide even further cost savings. In other implementations, the camera may have a water tight or sealed construction to further preclude or eliminate the chance of condensation forming at the lens optic elements.

When constructing the camera (e.g., assembling the lens 28) in a negative vacuum pressure (to provide the vacuum space between lens elements), the negative vacuum pressure may distort or provide a distortion pressure on the curvature of the optic elements. Optionally, the camera may be constructed in a nitrogen environment, which provides the benefit of being extremely dry and avoids issues that could arise in the negative vacuum pressure environment.

Referring to FIG. 3, the camera 14 may include a housing portion 40 that accommodates an imager printed circuit board (imager PCB) 42 having an imager 44 disposed thereat. For example, the housing portion 40 may be a front housing portion of that joins together with a rear housing portion to house the imager PCB within the camera housing. The imager PCB 42 may have the imager 44 disposed at a side and facing the lens. The housing portion 40 includes an aperture or passageway that receives or accommodates the lens barrel 46, the lens barrel 46 accommodating the lens 28 having the one or more optic elements 26. Thus, with the imager PCB 42 disposed within the housing portion 40 and the lens 28 and lens barrel 46 received at the housing portion 40, the imager 44 aligns with the lens 28 such that, as light passes through the lens 28, the optic elements 26 of the lens 28 image or focus the light onto an image plane of the imager 44. Thus, the light imaged or focused onto the image plane of the imager must also pass through the vacuum space and/or hydrophilic coating of the camera 14.

Figure 6:
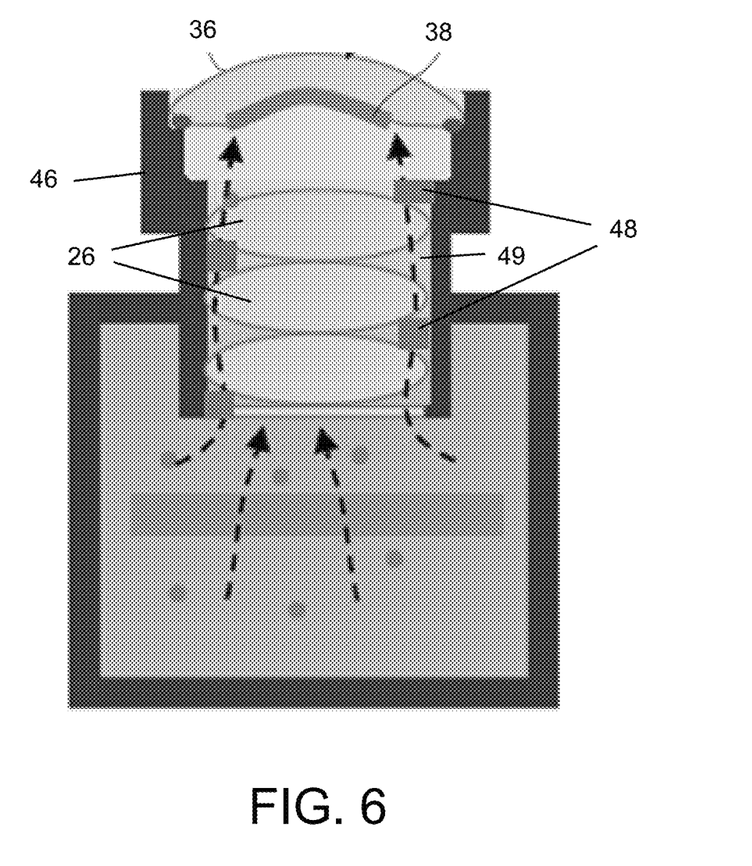
FIG. 6 is a cross section view of a camera with adhesive rings spaced apart along the lens barrel and securing the lens elements along the lens barrel, where the adhesive rings have respective gaps that are axially and circumferentially offset from one another.
Figure 7:
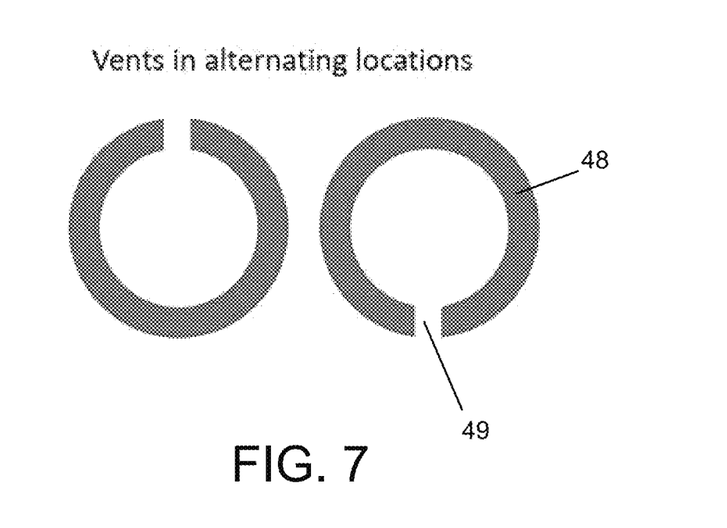
FIG. 7 is a top view of two of the adhesive rings of FIG. 6.

Optionally, and as shown in FIGS. 6 and 7, the lens 28 may include an arduous vent path through a series of seals or adhesive rings 48 disposed in the lens barrel at an inner surface of the lens barrel, and optionally at least in part serving to retain the lens elements 26 in place along the lens barrel 46. The vent path provides an indirect pathway for moisture to flow from the inner portion of the camera housing to the outermost lens element so that condensation is reduced or precluded from forming at the outermost lens element and moisture may still escape from between the lens elements to the inner portion of the camera. In the illustrated embodiment, the seals or sealing rings 48 are planar, annular seals disposed at or between adjacent lens elements 26. Each seal 48 includes an opening or a gap 49 so that air and moisture may move between the adjacent lens elements through the gaps. The seals 48 are positioned such that the gaps are disposed at different circumferential positions relative to one another. Thus, the gaps in the partially circumferential seals are not in axial alignment with one another along the lens barrel so that moisture moves more slowly or has a less direct path between the inner portion of the camera housing and the outermost lens element. This gives the outermost lens element time to heat up (e.g., due to self-heating of the camera) and the vent path between the seals 48 allows the moisture to eventually escape back into the inner portion of the camera.

Figure 8:
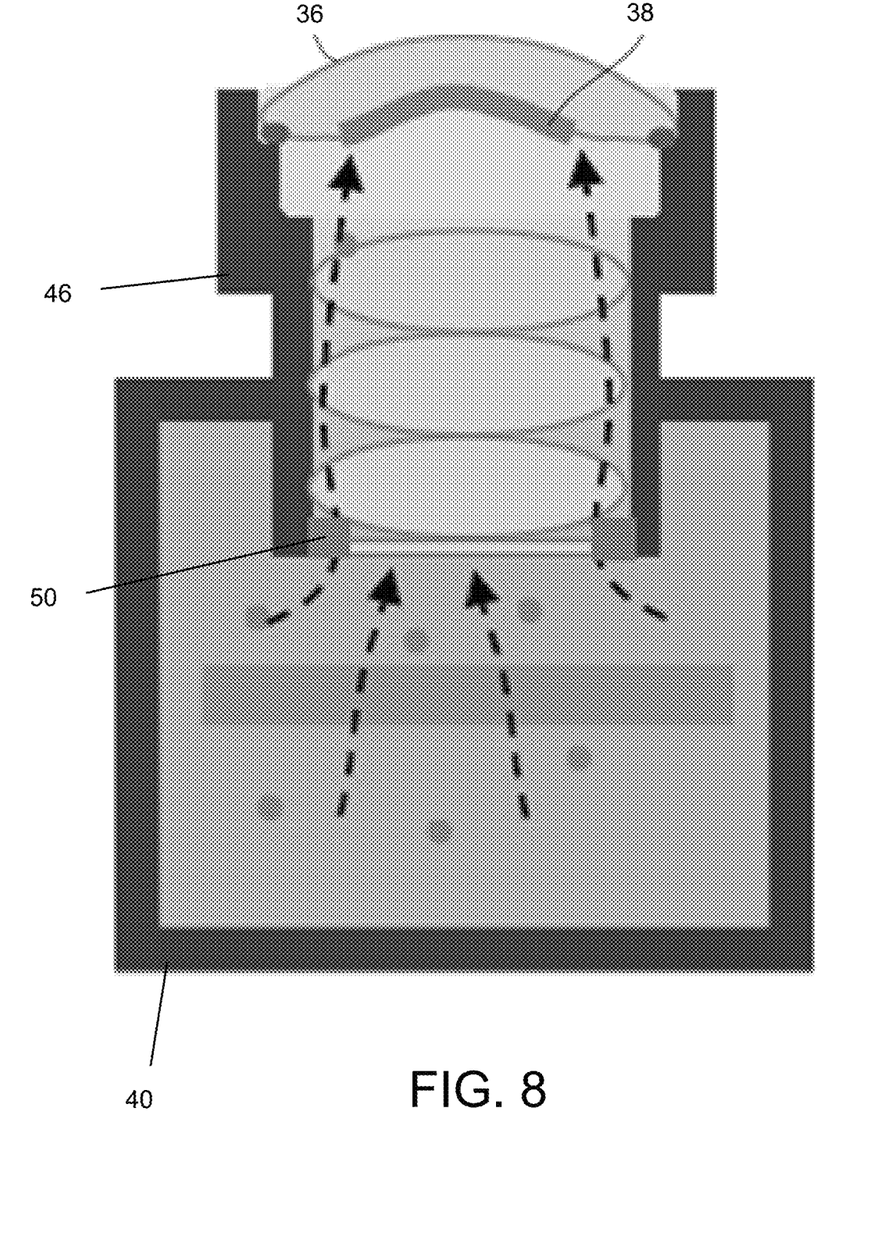
FIG. 8 is a cross section view of a camera with the innermost lens element of the lens sealed from the inner portion of the camera housing.

Optionally, and as shown in FIG. 8, a continuous seal or adhesive ring 50 may be disposed at the inner end of the lens barrel 46 to fully seal the lens barrel 46 from the inner portion of the camera housing 40. That is the innermost lens element may be fully sealed (i.e., the seal fully circumscribes the lens element 26). Fully sealing the innermost lens element maintains the moisture level in the lens barrel 46 when the camera is disposed at the vehicle equal to the moisture level when the lens barrel was first assembled. The moisture level may be established at a low level during assembly by assembling the lens barrel in a vacuum or nitrogen environment.

The lens 28 may be optically focused and aligned with the imager 44 via any suitable manner. For example, the lens 28 may be focused and aligned with the imager after the vacuum space has been formed between optic elements and/or after the hydrophilic coating has been applied at one or more surfaces of the lens so that focus and alignment may take into account any optic variation caused by the vacuum space and/or hydrophilic coating. For example, focus and alignment of the lens relative to the imager may include laser welding or other attachment techniques, such as by utilizing aspects of the cameras and systems and processes described in U.S. Pat. No. 11,199,758 and/or U.S. Publication Nos. US-2022-0103723; US-2021-0382375 and/or US-2021-0103119, which are all hereby incorporated herein by reference in their entireties.

The camera may otherwise comprise any suitable construction for controlling or accommodating changes in the camera when the camera is exposed to extreme temperatures, such as below −20 degrees C. or below −40 degrees C. and/or above 60 degrees C. or above 80 degrees C., and may utilize aspects of the cameras described in U.S. Publication Nos. U.S. Publication Nos. US-2020-0412925; US-2020-0033549; US-2020-0154020; US-2020-0137926; US-2020-0001787; US-2019-0306966; US-2019-0121051; US-2019-0124243 and/or US-2019-0124238, which are all hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Optionally, the imaging array may comprise a CMOS imaging array having at least 300,000 photosensor elements or pixels, more preferably at least 500,000 photosensor elements or pixels and more preferably at least one million photosensor elements or pixels, arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The imaging device and control and image processor and any associated illumination source, if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Publication Nos. US 2010-0020170 and/or US-2009-0244361, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular camera assembly, the vehicular camera assembly comprising:
    a lens barrel accommodating at least an outer lens element and an inner lens element;
    a housing having a first portion and a second portion that are joined together;
    an imager printed circuit board (imager PCB), wherein the imager PCB comprises a first side and a second side opposite the first side and separated from the first side by a thickness of the imager PCB, wherein an imager is disposed at the first side of the imager PCB;
    wherein the imager comprises a two dimensional imaging array having at least one million photosensors arranged in rows and columns;
    wherein the lens barrel is disposed at the first portion of the housing such that the imager is aligned with the inner lens element and the outer lens element, and wherein the inner lens element is disposed closer to the imager than the outer lens element;
    wherein a vacuum exists in a space between the outer lens element and the inner lens element to thermally insulate an outer surface of the outer lens element from an inner surface of the inner lens element, and wherein the outer surface of the outer lens element faces away from the imager and the inner surface of the inner lens element faces toward the imager; and
    wherein, with the imager aligned with the lens barrel, light passing through (i) the outer lens element, (ii) the vacuum and (iii) the inner lens element is imaged by the imager.

2. The vehicular camera assembly of claim 1, further comprising a heating element configured to keep the inner lens element at a temperature greater than the outer lens element.

3. The vehicular camera assembly of claim 2, further comprising a temperature sensor, and wherein the vehicular camera assembly operates the heating element based on temperature measured by the temperature sensor.

4. The vehicular camera assembly of claim 1, wherein the lens barrel accommodates an additional lens element disposed between the inner lens element and the imager with an additional space between the inner lens element and the additional lens element.

5. The vehicular camera assembly of claim 4, wherein there is not a vacuum in the additional space between the additional lens element and the inner lens element.

6. The vehicular camera assembly of claim 4, wherein a vacuum exists in the additional space between the additional lens element and the inner lens element.

7. The vehicular camera assembly of claim 1, wherein the lens barrel accommodates (i) a first additional lens element disposed between the inner lens element and the imager with a first additional space between the inner lens element and the first additional lens element, and (ii) a second additional lens element disposed between the first additional lens element and the imager with a second additional space between the first additional lens element and the second additional lens element.

8. The vehicular camera assembly of claim 7, wherein a first adhesive ring is disposed along the lens barrel and at least partially circumscribes the first additional lens element to secure the first additional lens element along the lens barrel, and wherein a second adhesive ring is disposed along the lens barrel and at least partially circumscribes the second additional lens element to secure the second additional lens element along the lens barrel, and wherein the first adhesive ring and the second adhesive ring both comprise a respective gap so that (i) the first additional space fluidly communicates with the second additional space, and (ii) the second additional space fluidly communicates with an inner cavity of the housing between the first and second portions of the housing.

9. The vehicular camera assembly of claim 8, wherein the respective gaps of the first adhesive ring and the second adhesive ring are circumferentially offset from one another about the lens barrel so that the respective gaps are not axially aligned with one another along the lens barrel.

10. The vehicular camera assembly of claim 1, wherein the housing comprises a plastic housing.

11. The vehicular camera assembly of claim 1, wherein the inner surface of the inner lens element is coated with a hydrophilic coating.

12. The vehicular camera assembly of claim 11, wherein the hydrophilic coating comprises a plasma hydrophilic coating.

13. The vehicular camera assembly of claim 1, wherein thermally insulating the outer surface of the outer lens element from the inner surface of the inner lens element reduces formation of condensation at the inner surface of the inner lens element.

14. The vehicular camera assembly of claim 1, wherein, with the vehicular camera assembly disposed at a vehicle, the outer lens element is exposed exterior of the vehicle.

15. A vehicular camera assembly, the vehicular camera assembly comprising:
  a lens barrel accommodating at least an outer lens element and an inner lens element;
  a housing having a first portion and a second portion that are joined together;
  an imager printed circuit board (imager PCB), wherein the imager PCB comprises a first side and a second side opposite the first side and separated from the first side by a thickness of the imager PCB, wherein an imager is disposed at the first side of the imager PCB;
  wherein the imager comprises a two dimensional imaging array having at least one million photosensors arranged in rows and columns;
  wherein the lens barrel is disposed at the first portion of the housing such that the imager is aligned with the inner lens element and the outer lens element, and wherein the inner lens element is disposed closer to the imager than the outer lens element;
  wherein a vacuum exists in a space between the outer lens element and the inner lens element to thermally insulate an outer surface of the outer lens element from an inner surface of the inner lens element, and wherein the outer surface of the outer lens element faces away from the imager and the inner surface of the inner lens element faces toward the imager;
  wherein the inner surface of the inner lens element is coated with a hydrophilic coating;
  wherein, with the imager aligned with the lens barrel, light passing through (i) the outer lens element, (ii) the vacuum and (iii) the inner lens element is imaged by the imager; and
  wherein, with the vehicular camera assembly disposed at a vehicle, the outer lens element is exposed exterior of the vehicle.

16. The vehicular camera assembly of claim 15, wherein the lens barrel accommodates (i) a first additional lens element disposed between the inner lens element and the imager with a first additional space between the inner lens element and the first additional lens element, and (ii) a second additional lens element disposed between the first additional lens element and the imager with a second additional space between the first additional lens element and the second additional lens element.

17. The vehicular camera assembly of claim 16, wherein a vacuum exists in at least one of the first additional space or the second additional space.

18. The vehicular camera assembly of claim 16, wherein a first adhesive ring is disposed along the lens barrel and at least partially circumscribes the first additional lens element to secure the first additional lens element along the lens barrel, and wherein a second adhesive ring is disposed along the lens barrel and at least partially circumscribes the second additional lens element to secure the second additional lens element along the lens barrel, and wherein the first adhesive ring and the second adhesive ring both comprise a respective gap so that (i) the first additional space fluidly communicates with the second additional space, and (ii) the second additional space fluidly communicates with an inner cavity of the housing between the first and second portions of the housing.

19. The vehicular camera assembly of claim 18, wherein the respective gaps of the first adhesive ring and the second adhesive ring are circumferentially offset from one another about the lens barrel so that the respective gaps are not axially aligned with one another along the lens barrel.

20. The vehicular camera assembly of claim 15, wherein the hydrophilic coating comprises a plasma hydrophilic coating.

21. A vehicular camera assembly, the vehicular camera assembly comprising:
  a housing having a first portion and a second portion that are joined together;
  an imager printed circuit board (imager PCB), wherein the imager PCB comprises a first side and a second side opposite the first side and separated from the first side by a thickness of the imager PCB, wherein an imager is disposed at the first side of the imager PCB;

wherein the imager comprises a two dimensional imaging array having at least one million photosensors arranged in rows and columns;

a lens barrel accommodating at least (i) an outer lens element, (ii) a first intermediate lens element with a first space between the first intermediate lens element and the outer lens element, (iii) a second intermediate lens element disposed between the first intermediate lens element and the imager with a second intermediate space between the first intermediate lens element and the second intermediate lens element, and (iv) an inner lens element disposed between the second intermediate lens element and the imager with a third intermediate space between the second intermediate lens element and the inner lens element;

wherein the lens barrel is disposed at the first portion of the housing such that the imager is aligned with the lens barrel, and wherein the inner lens element is disposed closer to the imager than the outer lens element;

wherein a first sealing ring is circumferentially disposed at an inner surface of the lens barrel at the first intermediate lens element, and wherein a second sealing ring is disposed at the inner surface of the lens barrel at the second intermediate lens element, and wherein a third sealing ring is disposed at the inner surface of the lens barrel at the inner lens element;

wherein the first sealing ring has a first gap, the second sealing ring has a second gap, and the third sealing ring has a third gap so that (i) the first space fluidly communicates with the second space via the first gap, (ii) the second space fluidly communicates with the third space via the second gap, and (ii) the third space fluidly communicates with an inner cavity of the housing between the first and second portions of the housing via the third gap;

wherein the first gap of the first sealing ring and the second gap of the second sealing ring are circumferentially offset from one another about the inner surface of the lens barrel so that the first and second gaps are not axially aligned with one another along the lens barrel, and wherein the second gap of the second sealing ring and the third gap of the third sealing ring are circumferentially offset from one another about the inner surface of the lens barrel so that the second and third gaps are not axially aligned with one another along the lens barrel; and wherein, with the imager aligned with the lens barrel, light passing through (i) the outer lens element, (ii) the first intermediate lens element, (iii) the second intermediate lens element, and (iv) the inner lens element is imaged by the imager.

22. The vehicular camera assembly of claim 21, wherein a hydrophilic coating is disposed at least one selected from the group consisting of (i) an inner surface of the outer lens element that faces toward the imager, (ii) an inner surface of the first intermediate lens element that faces toward the imager, (iii) an inner surface of the second intermediate lens element that faces toward the imager, or (iv) an inner surface of the inner lens element that faces toward the imager.

23. The vehicular camera assembly of claim 22, wherein the hydrophilic coating comprises a plasma hydrophilic coating.

24. The vehicular camera assembly of claim 21, wherein, with the vehicular camera assembly disposed at a vehicle, the outer lens element is exposed exterior of the vehicle.

25. The vehicular camera assembly of claim 21, wherein the first sealing ring comprises an adhesive ring that at least in part secures the first intermediate lens element at the inner surface of the lens barrel, and wherein the second sealing ring comprises an adhesive ring that at least in part secures the second intermediate lens element at the inner surface of the lens barrel, and wherein the third sealing ring comprises an adhesive ring that at least in part secures the inner lens element at the inner surface of the lens barrel.

* * * * *

UNITED STATES PATENT AND TRADEMARK OFFICE
CERTIFICATE OF CORRECTION

| | | |
|---|---|---|
| PATENT NO. | : 11,874,593 B2 | Page 1 of 1 |
| APPLICATION NO. | : 17/811320 | |
| DATED | : January 16, 2024 | |
| INVENTOR(S) | : Zhongyao Liu et al. | |

It is certified that error appears in the above-identified patent and that said Letters Patent is hereby corrected as shown below:

In the Claims

Column 12
Claim 22, Line 16, "coating is disposed at least one" should be --coating is disposed at at least one--

Signed and Sealed this
Thirteenth Day of February, 2024

Katherine Kelly Vidal
Director of the United States Patent and Trademark Office